(12) United States Patent
Patell

(10) Patent No.: US 11,976,774 B2
(45) Date of Patent: May 7, 2024

(54) DISPLAY STAND THAT ADJUSTS TO THE SIZE OF THE ITEM BEING DISPLAYED

(71) Applicant: Daniel Patrick Patell, Ballston Spa, NY (US)

(72) Inventor: Daniel Patrick Patell, Ballston Spa, NY (US)

( * ) Notice: Subject to any disclaimer, the term of this patent is extended or adjusted under 35 U.S.C. 154(b) by 0 days.

(21) Appl. No.: 18/319,036

(22) Filed: May 17, 2023

(65) Prior Publication Data

US 2023/0288014 A1     Sep. 14, 2023

Related U.S. Application Data

(63) Continuation of application No. 17/646,354, filed on Dec. 29, 2021, now Pat. No. 11,692,666.

(60) Provisional application No. 63/199,442, filed on Dec. 29, 2020.

(51) Int. Cl.
*F16M 11/04*     (2006.01)

(52) U.S. Cl.
CPC ................................ *F16M 11/048* (2013.01)

(58) Field of Classification Search
CPC .................................................. F16M 11/048
See application file for complete search history.

(56) References Cited

U.S. PATENT DOCUMENTS

| | | | | |
|---|---|---|---|---|
| 4,343,450 A * | 8/1982 | Anderson | ............. | A47F 7/0064 248/460 |
| 4,458,874 A * | 7/1984 | Rabas | ..................... | A47F 7/024 248/448 |
| 4,496,127 A * | 1/1985 | Nelson | ................. | A47B 23/042 40/745 |
| 5,690,310 A * | 11/1997 | Brown | ................. | A47B 23/043 248/448 |
| 6,776,385 B1 * | 8/2004 | Chang | .................. | A47B 23/043 248/910 |
| 7,040,583 B1 * | 5/2006 | Holland | ..................... | A47F 3/12 248/122.1 |
| 7,717,276 B2 * | 5/2010 | Alves | ...................... | A47F 1/125 211/59.2 |
| 11,692,666 B2 * | 7/2023 | Patell | ................... | F16M 11/041 248/122.1 |

* cited by examiner

*Primary Examiner* — Anita M King
(74) *Attorney, Agent, or Firm* — Dunlap Bennett & Ludwig, PLLC

(57) ABSTRACT

A display stand with an adjustable rear support that is movable along a base by way of a channel is provided. The rear support receives and sandwiches objects, each of different thicknesses, between and against a support lip. The rear support is orientated at an obtuse angle relative to the base. The channel is tapered, facilitating a tapered slide nut to move there along in concert with the rear support. A threaded fastener interconnects the rear support and the slide nut by way of the channel. The slide nut provides female threading engaging the threading of the threaded fastener. The rear support provides a slot that seats on a protrusion of the slide nut to provide anti-rotation functionality.

10 Claims, 4 Drawing Sheets

DISPLAY STAND THAT ADJUSTS TO THE SIZE OF THE ITEM BEING DISPLAYED

CROSS-REFERENCE TO RELATED APPLICATION

This application claims the benefit of priority of U.S. non-provisional application Ser. No. 17/646,354, filed 29 Dec. 2021, as a continuation thereof, the contents of which are herein incorporated by reference.

BACKGROUND OF THE INVENTION

The present invention relates to display stands and, more particularly, a display stand that adjusts to the size and thickness of the object being displayed.

Collectors struggle to display their various items due to the wide variety of dimensions and configuration of the different items. An uncountable number of specialized stands would be needed to attractively display all possible varieties of collectibles a collector owns or may acquire.

Items displayed in current display stand designs undesirably shift, settle, or move in the stand when subject to even the slightest force, such as the floor shaking when a passerby walks by. Also, current display stands are disadvantageously tailored for only one type of item, rendering them ill-suited for attractive presentation. Additionally, varying dimensions of collectible thickness yield different display angles, compromising the aesthetics of the overall presentation when the size or encapsulation methods are different than contemplated. In short, designs of the prior art are not adaptable to accept different configurations but rather are specialized to fit only a single, specific configuration, and thus lack universality.

As can be seen, there is a need for a display stand that adjusts to the size and thickness of the item being displayed, solving the item-compatibility problem through an adjustability function selectively set by the user.

The design embodied in the present invention actively engages the collectible being displayed with its variable support functionality, which does not allow the object or collectible to move while engaged. The display stand of the present invention is adapted to present various thicknesses of collectibles at a consistent angle, thereby achieving repeatable aesthetics. The variable stand design is securely adjustable by the user to accommodate any collectible (namely sports or gaming cards) in the desired configuration or arrangement. This adjustability permits all thicknesses and configurations to be consistently, repeatedly displayed at the same desired angle.

SUMMARY OF THE INVENTION

In one aspect of the present invention, a display stand includes a base with a channel recessed therein; a lip protruding above the base along a distal end thereof; a rear support ridable along the channel by way of a fastener; and a slide nut housed in the channel, the slide nut engages the fastener so that the fastener moves between a loose condition and a snug condition of the rear support relative to the base.

In another aspect of the present invention, the wherein the rear support comprises a first leg that is oriented at an obtuse angle relative to the base in the snug condition, wherein sidewalls of the channel and the slide nut, respectively, are complementarily tapered, wherein the rear support comprises a second leg provide a protrusion slot along a bottom surface thereof, and wherein the protrusion slot seats on a protrusion of the slide nut, wherein the fastener provides male threading and wherein the slide nut provides female threading that operatively associate, wherein the female threading is embodied in a nut housed in a compartment defined by the slide nut, wherein the slide nut has a slide opening for slidably receiving the nut; further including a thumb screw engaging a head of the fastener for selectively moving between the loose and snug conditions, wherein the thumb screw provides an upper recess dimensioned to receive said head of the fastener, and wherein the fastener passes through the second leg of the rear support.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a display stand with an adjustable rear support that is movable along a base by way of a channel. The rear support receives and sandwiches objects, each of different thicknesses, between and against a support lip. The rear support is orientated at an obtuse angle relative to the base. The channel is tapered, facilitating a tapered slide nut to move there along in concert with the rear support. A threaded fastener interconnects the rear support and the slide nut by way of the channel. The slide nut provides female threading engaging the threading of the threaded fastener. The rear support provides a slot that seats on a protrusion of the slide nut to provide anti-rotation functionality.

Figure 1:
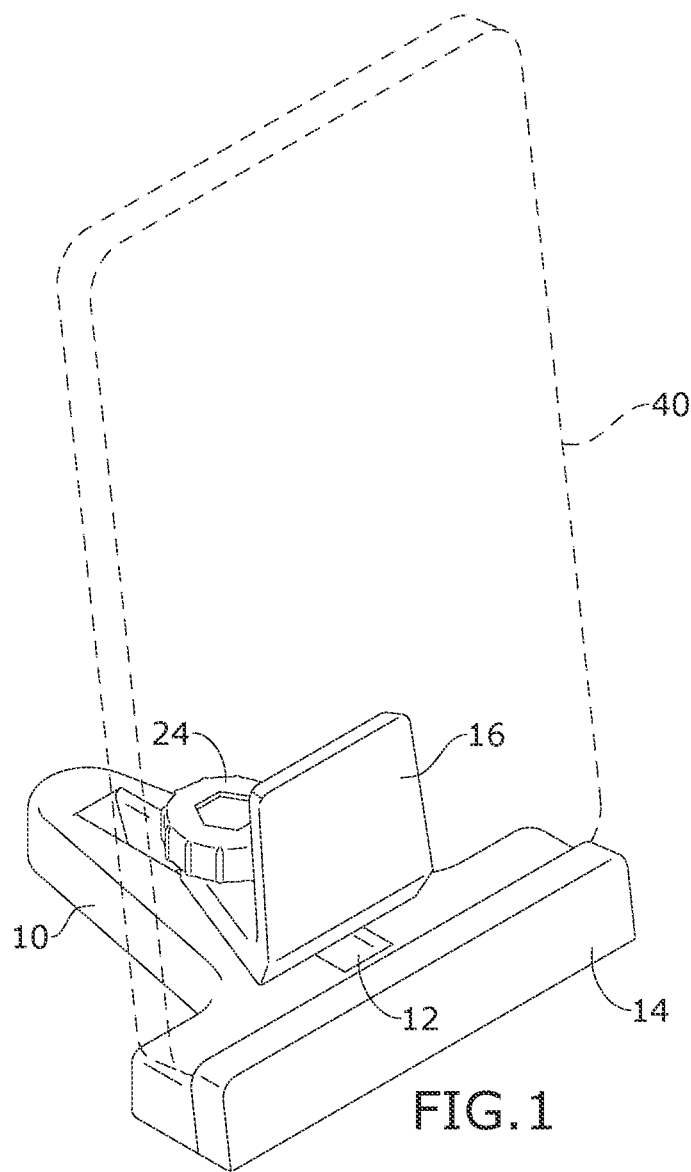
FIG. 1 is a top front perspective view of an exemplary embodiment of the present invention, shown in use, with an object 40 shown in hidden lines for clarity.
Figure 2:
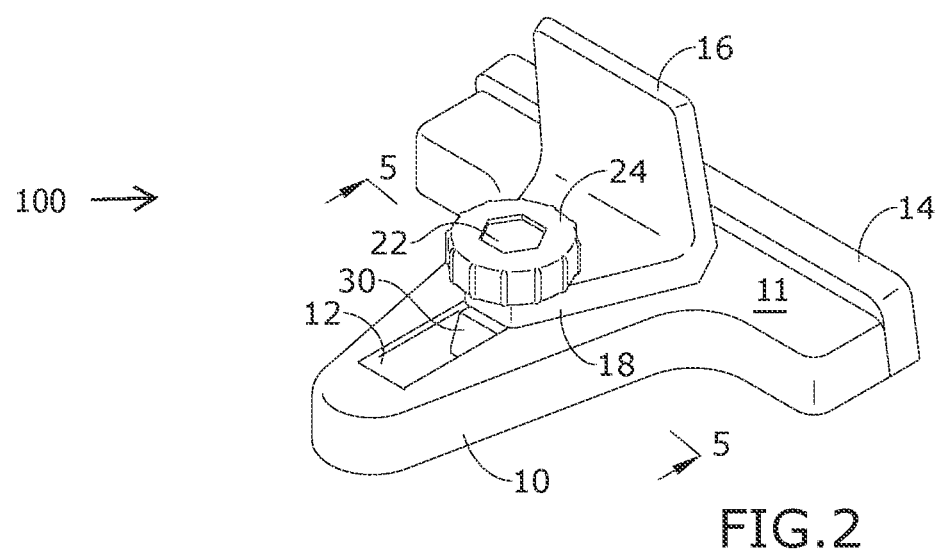
FIG. 2 is a top perspective side view of an exemplary embodiment of the present invention.
Figure 3:
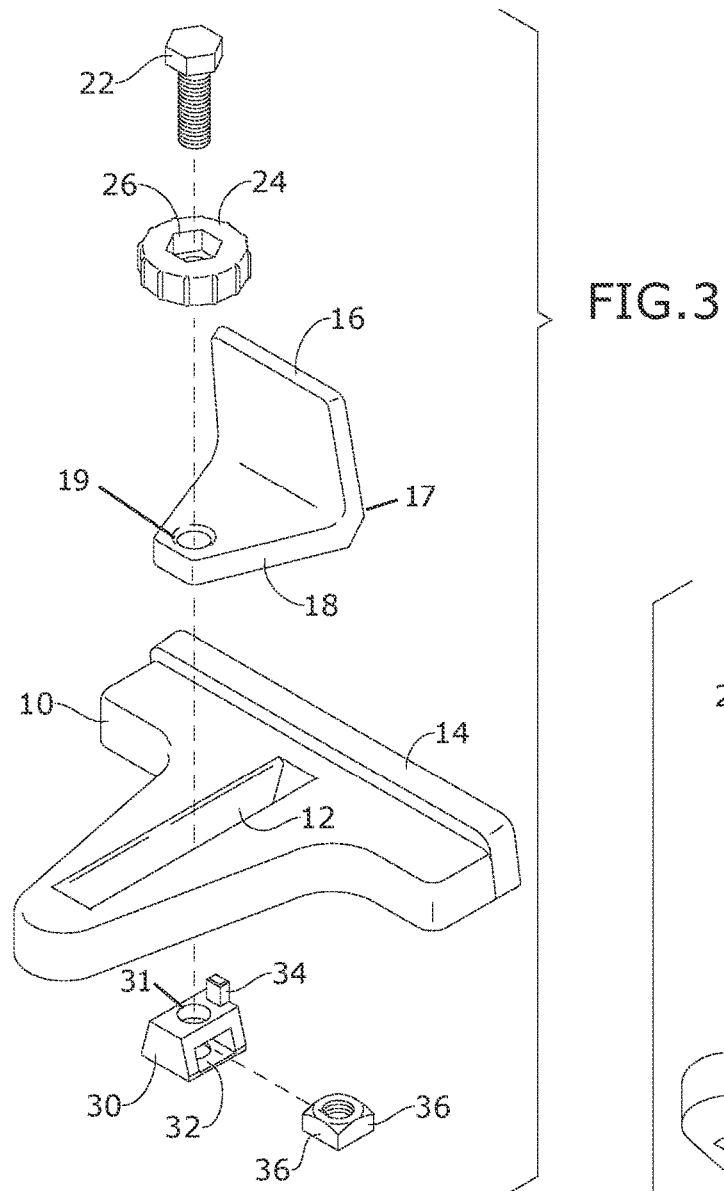
FIG. 3 is an exploded top side perspective view of an exemplary embodiment of the present invention.
Figure 4:
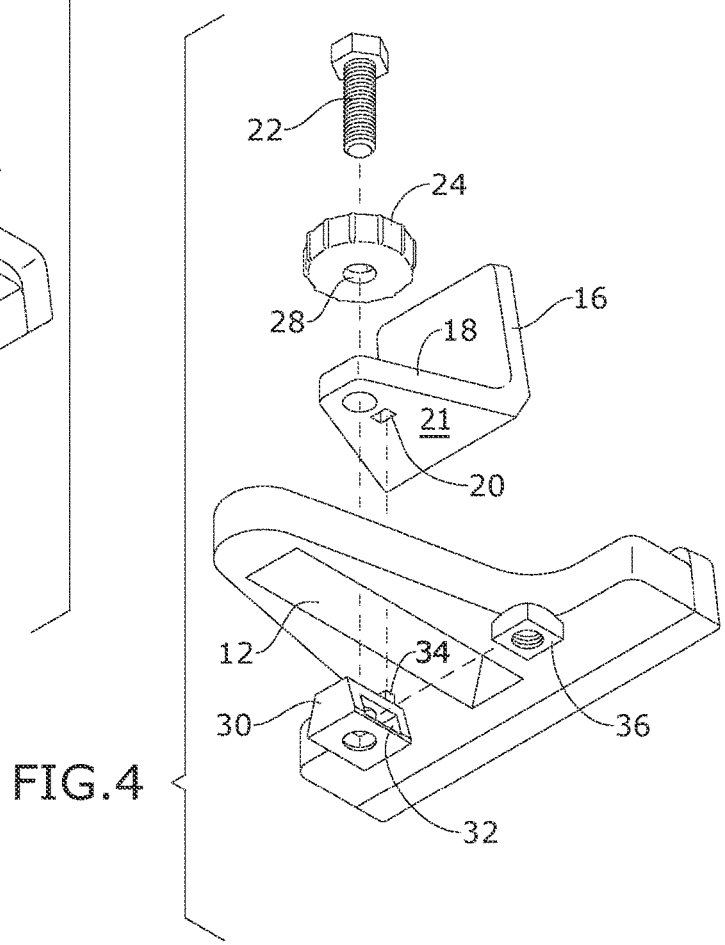
FIG. 4 is an exploded bottom side perspective view of an exemplary embodiment of the present invention.
Figure 5:
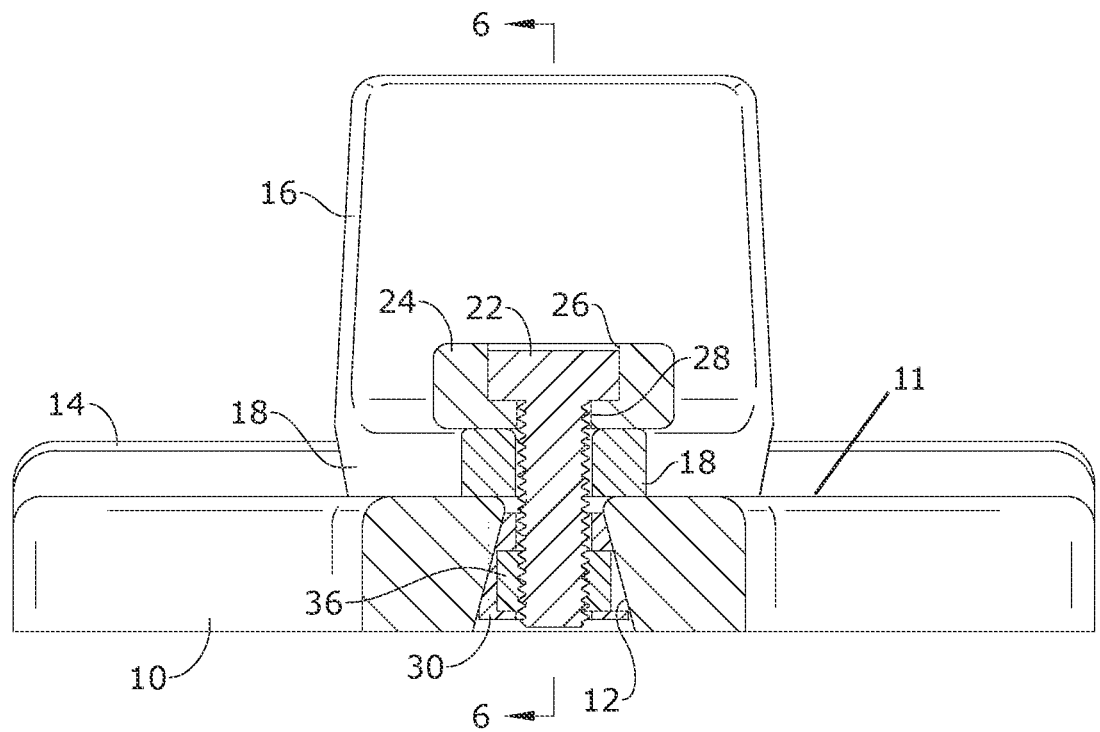
FIG. 5 is a section view of an exemplary embodiment of the present invention, taken along line 5-5 in FIG. 2.
Figure 6:
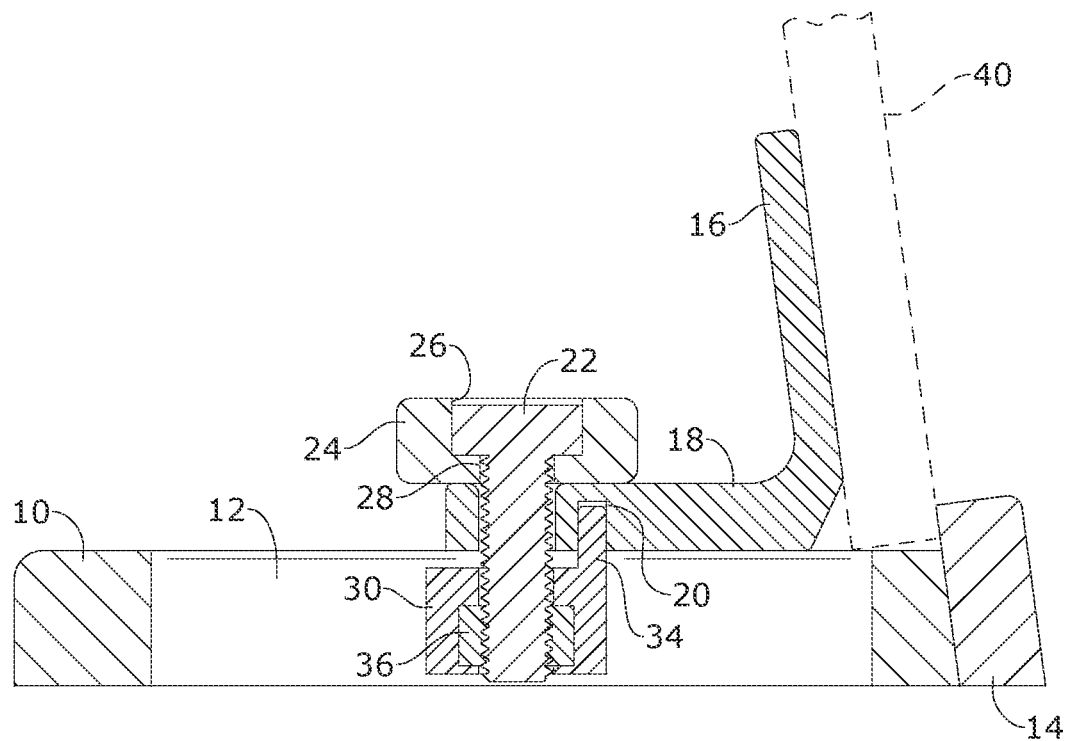
FIG. 6 is a section view of an exemplary embodiment of the present invention, taken along line 6-6 in FIG. 5.

Referring now to FIGS. 1 through 8, the present invention may include an adjustable display stand 100. The display stand 100 may include a base 10 having a channel 12 recessed into an upper surface 11 thereof. The channel 12 may be tapered, wherein its cross-sectional width expands as the channel 12 extends away from the upper surface 11, as illustrated in FIG. 5. In other words, the sidewalls of the channel 12 taper away from each other. A support lip 14, along a distal end of the base 10, protrudes beyond the upper surface 11.

Figure 7:
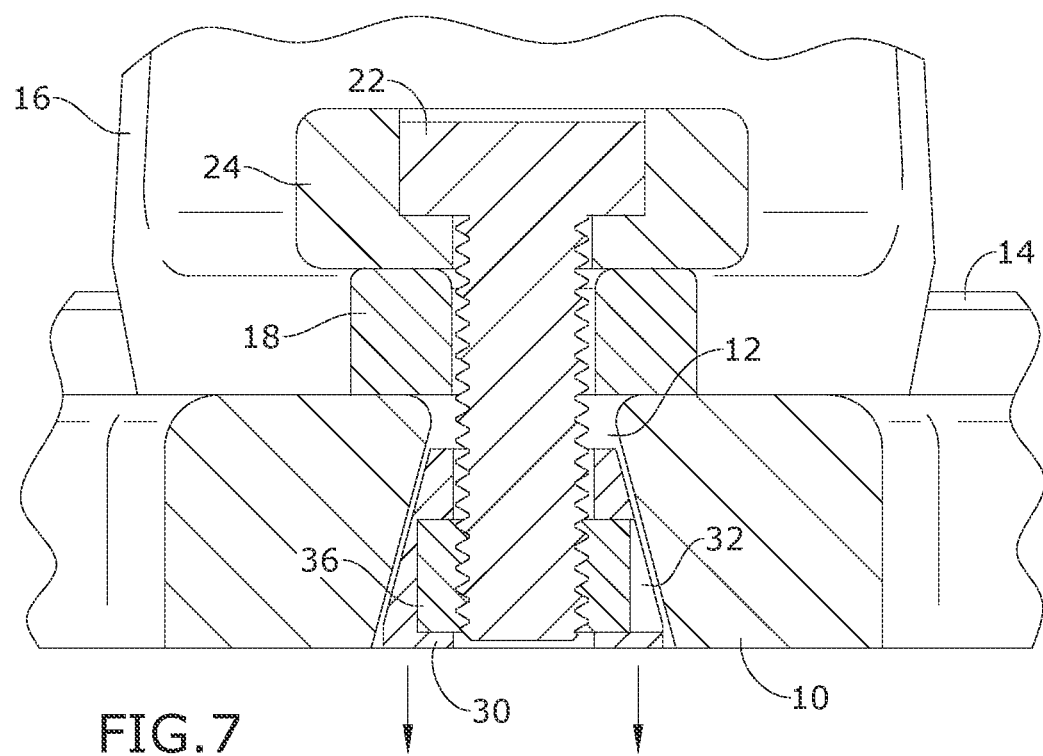
FIG. 7 is a detailed front section view of an exemplary embodiment of the present invention, illustrating raising fastener 22 to release the slide nut 30.

The display stand 100 may include a rear support 17 having two legs, a first leg 16 and a second leg 18 disposed at an acute angle relative to each other. The second leg 18 may have a fastener hole 19 dimensioned to receive an elongated threaded fastener 22 so that the rear support 17, engaged by the elongated threaded fastener 22, can ride along the channel 12. A thumb screw 24 having a bottom through hole 28 and a communicating upper recess 26 may slidably receive the elongated threaded fastener 22. The upper recess 26 may be dimensioned and adapted to snugly receive the head of the elongated threaded fastener 22, as illustrated in FIG. 7.

A lower surface 21 of the second leg 18 may provide a post slot 20 for receiving a protrusion 34 on an upper portion of a slide nut 30. The slide nut 30 may have tapered sidewalls to complement the tapered channel 12. The slide nut 30 may define a compartment dimensioned and adapted to slidably receive a nut 36 by way of a slide opening 32. The threaded hole of the nut 36 may align with an upper opening 31 of the slide nut 30. The upper opening 31 and the threaded hole of the nut 36 receive the elongated threaded fastener 22 extending through tapered channel 12, wherein the threaded hole of the nut 36 provides the female thread (internal threading) for engaging of the threads of the elongated threaded fastener 22 so it can selective be linear moved in or out of the channel 12. This in turn further facilitates the riding/sliding of the rear support 17 along the channel 12, when the thumb screw 24 is a loosened condition.

The slide nut 30 bears against the tapered channel of the base 10 when tightened, this increases the holding power of the overall structure for heavier collectibles 40 and prevents jamming or binding as compared to a non-tapered channel 12. The interface of the slot 20 and the protrusion 34 provide anti-rotation functionality. When the friction bolt thumb screw 24 is moved to a tightened condition, by way of friction grip protrusions, the rear support 17 is fixed to the upper surface 11 of the base 10, wherein the first leg 16 is oriented at an obtuse angle relative to the upper surface 11, wherein first leg 16 angles away from the support lip 14.

Figure 8:
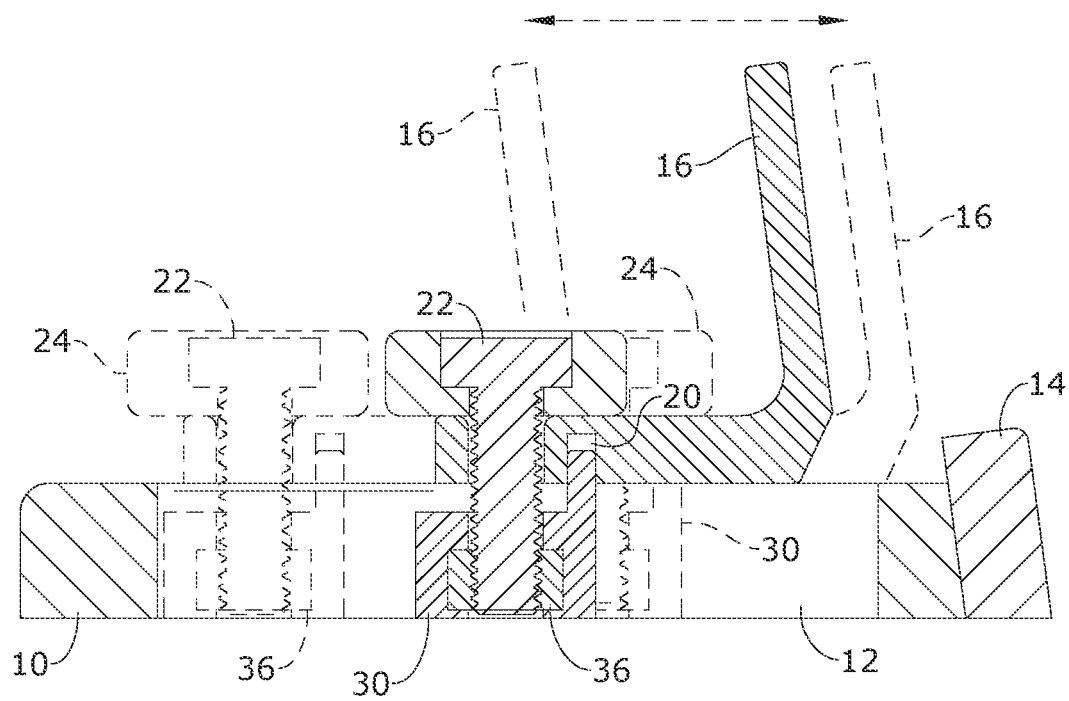
FIG. 8 is a detailed section side view of an exemplary embodiment of the present invention, illustrating the adjustability of the rear support 17 relative to the support lip 14.

The fastener 22 and slide nut 30 engagement may be tightened and loosened by the user via the thumb screw 24 to release the rear support 17 to permit its adjustment to a desired setting relative to the thickness of the collectible 40 being displayed, as illustrated in FIG. 8. The friction fastener 22 may then be tightened into the slide nut 30 using the thumb screw 24 to hold the rear support 17 tight to the base 10 to securely hold a collectible 40 at the proper angle within the stand 100.

The design could be improved through the employment of an automatic retention system such as a spring or rubber band to eliminate the need for a thumb screw, but this will add unappealing bulk to the assembly.

A method of using the present invention may include the following. The stand 100 disclosed above may be provided. A user simply loosens the fastener 22 and slides the rear support 17 to a setting larger than the collectible 40 to be displayed. The user places the collectible 40 in the stand 100 against the front lip 14 of the main base, slides the rear support 17 forward against the backside of the collectible 40, and tightens the thumb screw 24.

As used in this application, the term "about" or "approximately" refers to a range of values within plus or minus 10% of the specified number or any deviation as would be appreciated by one of ordinary skill in the art to operate satisfactorily for an intended purpose. And the term "substantially" refers to up to 90% or more of an entirety.

Recitation of ranges of values herein are not intended to be limiting, referring instead individually to any and all values falling within the range, unless otherwise indicated, and each separate value within such a range is incorporated into the specification as if it were individually recited herein.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A display stand, comprising:
a base with a channel recessed therein;
a rear support ridable along the channel by way of a fastener; and
a slide nut housed in the channel, the slide nut engages the fastener so that the fastener moves between a loose condition and a snug condition of the rear support relative to the base,
wherein the rear support comprises a protrusion slot along a bottom surface thereof, and wherein the protrusion slot seats on a protrusion of the slide nut.

2. The display stand of claim 1, wherein the rear support comprises a first leg that is oriented at an obtuse angle relative to a supporting surface of the base.

3. The display stand of claim 2, further comprising a front lip spaced apart from a front portion of the base, and wherein the front lip and the first leg are approximately parallel relative to each other.

4. The display stand of claim 1, wherein the protrusion slot is along a second leg of the rear support.

5. The display stand of claim 1, wherein the fastener provides male threading and wherein the slide nut provides female threading that operatively associate.

6. The display stand of claim 5, wherein the female threading is embodied in a nut housed in a compartment defined by the slide nut.

7. The display stand of claim 6, wherein the slide nut has a slide opening for slidably receiving the nut.

8. The display stand of claim 7, further comprising a thumb screw engaging a head of the fastener for selectively moving between the loose and snug conditions.

9. The display stand of claim 8, wherein the thumb screw provides an upper recess dimensioned to receive said head of the fastener.

10. The display stand of claim 9, wherein the fastener passes through the second leg of the rear support.

* * * * *